Jan. 10, 1939.    H. C. STUERZL    2,143,174
INSTRUMENT LIGHTING
Filed Nov. 7, 1936    3 Sheets-Sheet 1

Inventor
Henry Charles Stuerzl

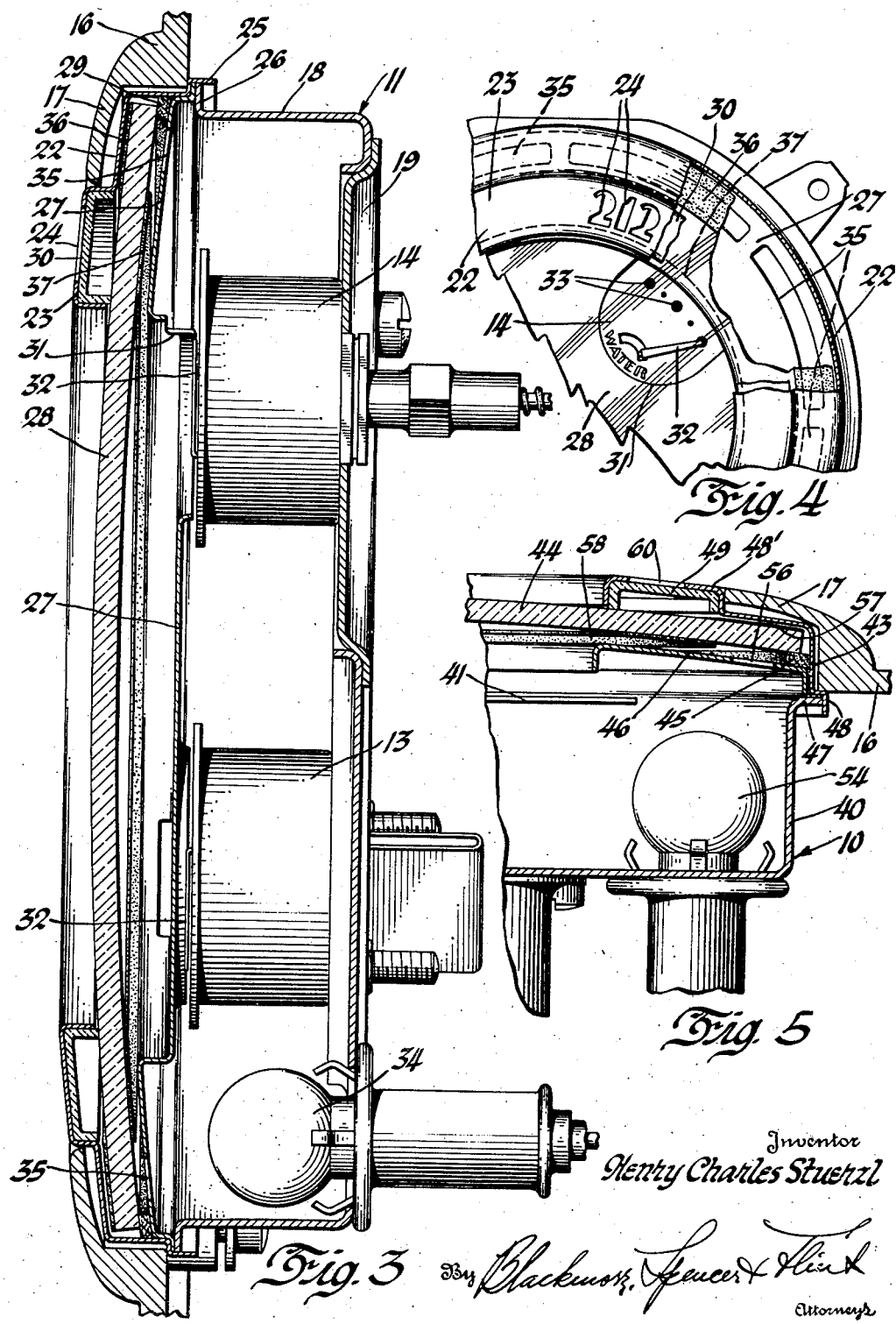

Patented Jan. 10, 1939

2,143,174

UNITED STATES PATENT OFFICE 2,143,174

INSTRUMENT LIGHTING

Henry Charles Stuerzl, Flint, Mich., assignor to General Motors Corporation, Detroit, Mich., a corporation of Michigan Application November 7, 1936, Serial No. 109,613

16 Claims. (Cl. 116—129)

This invention relates to illuminating means and more particularly to means for illuminating dials and indicia of instruments of vehicles in order that the operator may readily ascertain the conditions under which the vehicle is operating.

In driving a vehicle at night it is desirable that the operator may be able to see at a glance the several instruments and this necessitates the provision of some form of lighting means. The means for illuminating the instruments preferably should be so constructed that the several faces or dials of the different instruments and indicia are adequately lighted without any glare in the eyes of the operator.

I have devised a means for illuminating the instruments in which glare is greatly reduced. The instrument faces and pointers are indirectly lighted by means of light reflected from the walls of the instrument casing. Preferably the graduations and descriptions of the instruments or gauges are printed on the faces of the instruments and are illuminated therewith. I utilize a novel lighting means involving opaque paint preferably arranged in rings on the front and back of a glass dial in such a way that rays of light are caused to travel within the plane of the glass dial and finally to be projected forwardly to illuminate indicia arranged in front of the glass dial.

A broad object of my invention is to provide an instrument panel of pleasing appearance having a novel means of illuminating which greatly reduces glare.

It is also an object of my invention to provide a means for illuminating indicia involving travel of light rays within the plane of a transparent dial.

Another object of my invention is to provide an instrument panel of pleasing appearance in which the several instruments are mounted in two groups.

A further object of my invention is to provide means for illuminating instrument panels involving the use of light reflected from walls of a casing and light rays which by reflection and diffusion are caused to travel within the plane of a glass or other transparent dial.

A still further object of my invention is to provide a translucent ring of any desired color through which rays of light may be projected.

Another object of my invention is to provide improved mounting means for instruments.

Other advantages and objects of my invention will become more apparent as the description proceeds.

Reference is herein made to the accompanying drawings forming a portion of this specification, in which:

Figure 3 is a view on line 3—3 in Figure 1;

Figure 4 is a fragmentary detail view with parts broken away showing the construction of one of the instruments whereby indicia may be illuminated;

Figure 5 is a sectional view taken substantially on line 5—5 in Figure 1;

Figure 1:
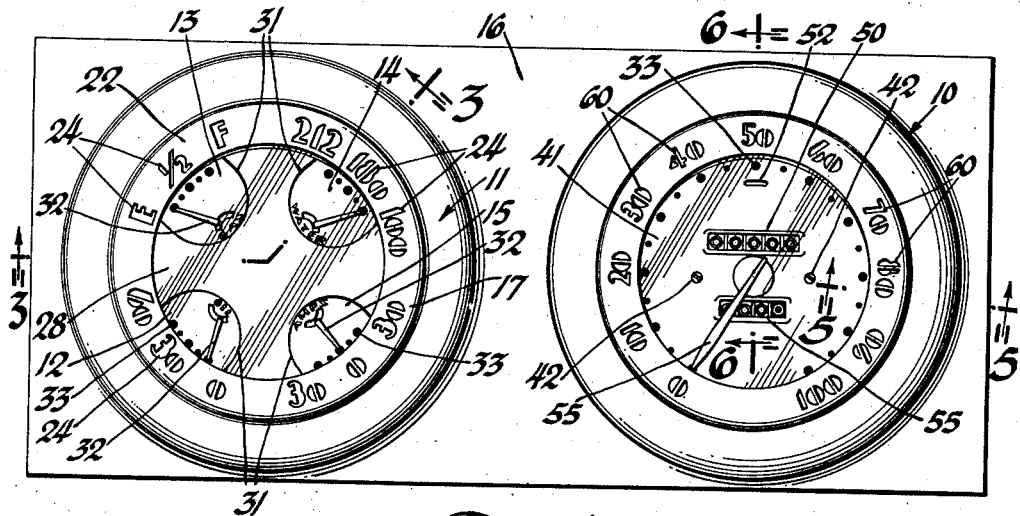
Figure 1 is a front elevational view of an instrument panel showing the two symmetrically arranged groups of instruments.
Figure 2:
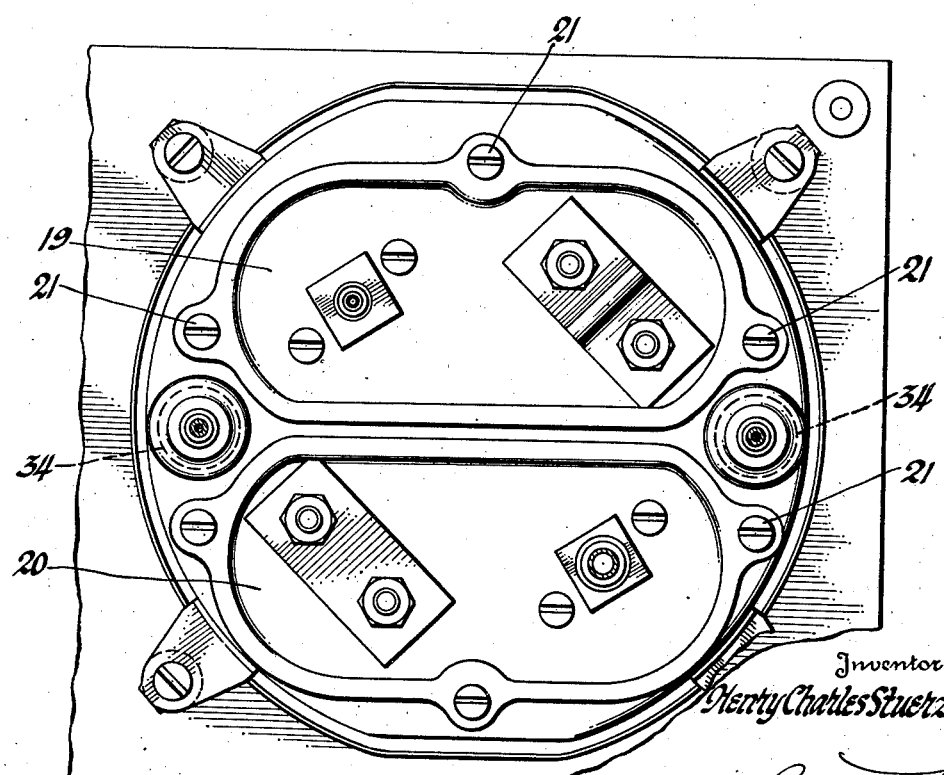
Figure 2 is a view showing the manner in which instruments may be mounted in groups of two.

In the drawings, 10 is a speedometer unit, 11 is a combination instrument in which four gauges 12, 13, 14 and 15 are grouped. The units 10 and 11 preferably may be fastened to a die-cast frame 16 which may be secured to a car instrument board. The frame 16 has a portion 17 which projects over the faces of the instruments as shown in Figures 3, and 5.

Referring especially to Figures 1, 2, 3 and 4, 18 indicates a casing which houses the four instruments or gauges 12, 13, 14 and 15 which in the embodiment shown are the oil pressure gauge, gasoline gauge, water temperature indicator and ammeter, respectively. Plates 19 and 20 are fastened to casing 18 by means of screws 21, the plates 19 and 20 each supporting a group of two instruments.

A bezel 22 having a channel portion 23 in which cut out indicia 24 are formed is nested within the portion 17 of the die-cast frame 16, as shown in Figure 3. A flange 25 on the bezel is adapted to be crimped over a flange 26 on the casing 18 and to hold a retainer plate 27, a glass or other transparent dial 28, a gasket 29 and a translucent channel ring 30 in fixed relation as best seen in Figure 3. The several gauges or instruments are visible to the operator by means of openings 31 formed in the retainer plate. Each gauge has a pointer 32. Graduations or dots 33 are painted on the face of each gauge.

The face and pointer of each instrument are illuminated by means of the light bulbs 34 within the casing. The lateral walls of the casing reflect the light onto the several instrument faces. The face of each instrument has the word "water", "amps", "gas", or "oil" painted thereon.

The cut out portions 24 in the bezel member 22 which serve as indicia for the several instruments are illuminated in an indirect manner as follows: Light from the bulbs 34 within the casing 18 passes through a generally circular series of openings 35 in the retainer plate 27 as best seen in Figures 3 and 4 and then through the glass or other transparent dial until it strikes a ring 36 of opaque paint on the front side of the transparent dial. By means of reflection and diffusion at an angle greater than the critical angle a portion of the rays are caused to travel within the plane of the glass dial. A second ring 37 of opaque paint on the back of the glass dial in line with the channel portion of the bezel and the channel ring of translucent material causes a portion of the rays traveling within the glass dial to be reflected and projected against the ring 30 of translucent material and illuminate the same and the cut out characters or figures 24 in the bezel 22.

The speedometer unit 10 is constructed in a manner generally similar to that of the combined instrument unit 11. Referring especially to Figures 1, 5, 6 and 7, an open casing member 40 is provided in the open end of which is shown a speedometer dial member 41 secured to the mechanism by means of screws 42. By means of bezel 43, a glass or other transparent dial or disc 44, a circular gasket 45 and an annular retainer plate 46 are secured to a flange 47 of casing 40, bezel 43 having a portion 48 which may be crimped over flange 47 for securing purposes.

Positioned between a channel portion 48' of the bezel 43 and the glass or other transparent disc 44 is an inverted channel type ring 49 which may be made of suitable translucent material such as pyralin. It will be clear from Figure 6 that the bezel covers an appreciable portion of the glass disc 44 and has cut away portions 60 in the channel portion thereof which represent the speed range of the speedometer. These openings with the graduations on dial 41 complete the speedometer indicia.

Figures 6, 7:
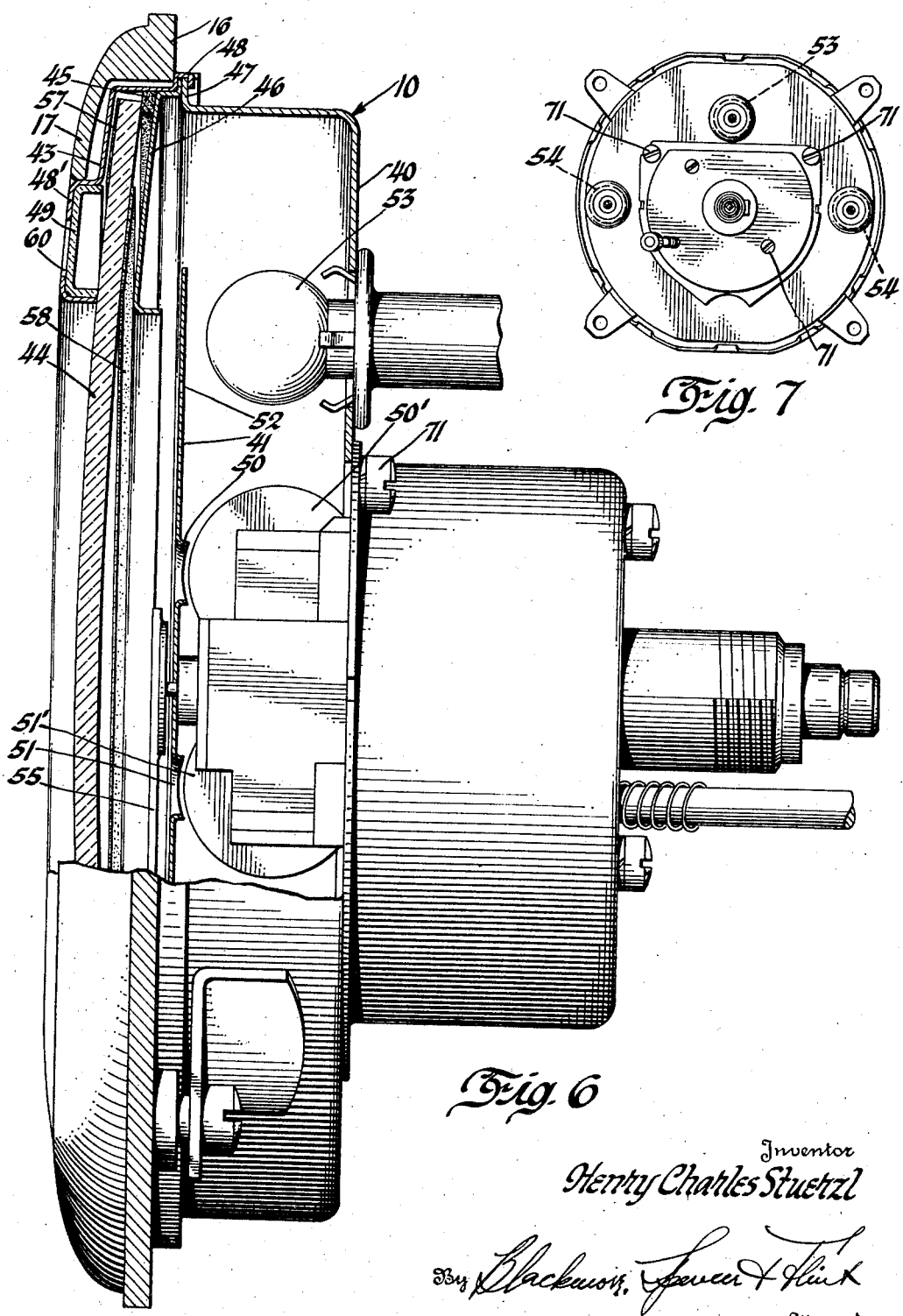
Figure 6 is a view on line 6—6 in Figure 1.
Figure 7 is a view showing the mounting means for the speedometer.

Windows 50 and 51 are provided in dial 41 through which the odometers 50' and 51', respectively, of the speedometer may be visible to the operator. Another window 52 is provided in dial 41 through which a signal or "tell tale" light 53 may also be visible. This light is preferably connected to the lighting system in such a way as to indicate to the driver that the upper beam of the headlamps is on. Two light bulbs 54 located as shown in Figures 5 and 7 illuminate the dial 41 and pointer 55 by means of light reflected from the walls of the casing 40. The speedometer mechanism is secured to the casing 40 by means of screws 71.

The indicia 60 are indirectly lighted by means of a portion of the light rays from bulbs 54 which pass through openings 56 in retainer plate 46 as best seen in Figure 5. It will be understood that preferably there are a plurality of the openings 56 arranged in a generally regular circular series near the outer edge of the retainer plate similar to the openings 35 in the combination instrument. Light rays pass through the openings 56 and then to and through the glass or other transparent disc 44 where they are diffused and reflected at an angle greater than the critical angle by means of a ring 57 of opaque paint on the front of disc 44 in substantial alignment with the openings and caused to travel within the plane of the glass disc. A second ring of opaque paint 58 on the back of transparent dial 44 causes a portion of the light rays within the transparent panel to be reflected in such manner that they no longer travel within the plane of the transparent dial but are projected against the ring of translucent material 49, thus illuminating the ring and the cut out indicia or numerals 60.

It will be understood that the thicknesses of the several rings of opaque paint shown in the drawings are greatly exaggerated for purpose of illustration. In both the speedometer and combination instrument the retainer plate and dials preferably are painted to match. I prefer to make the translucent ring of material of a green color as this does not readily tire the eyes of the operator.

From the above description it will be apparent that the pointers and dials of the several instruments are indirectly illuminated by means of light reflected from the walls of the casings, while the cut out indicia in the bezel member are illuminated by means of light rays which are first diffused and reflected to travel within the glass or other transparent dial and then reflected and projected through the colored translucent ring and through the cut away indicia portions.

Various changes in the combinations and arrangements of the several parts may be made without departing from the spirit of my invention and I do not wish to limit the patent granted thereon other than as necessitated by the prior art.

I claim:

1. In a device for indicating, a casing open at one end, a retainer plate having an opening near the edge thereof and a second opening spaced from the edge opening, an instrument secured to the casing behind the second opening, a transparent panel in front of the retainer plate having a ring of opaque paint near the outer edge thereof in substantial alignment with the opening near the edge of the retainer plate and a second ring of opaque paint of smaller diameter on the back thereof, a flanged bezel member having a channel portion in which are formed openings in alignment with the second ring of opaque paint, the flange being secured to the casing, a channel ring of translucent material fitting within the channel portion of the bezel and a light source within the casing for illuminating the face of the instrument and also for illuminating the ring of translucent material and the openings in the channel portion of the bezel member.

2. A device as in claim 1 in which the face of the instrument has graduations thereon.

3. A device as in claim 1 in which the transparent dial is formed of glass and a gasket is provided between the panel and the retainer plate.

4. In a device of the class described, a casing open at one end, a plate at the front of the casing having an opening near the edge thereof, a glass disc in front of said plate, a ring of opaque paint on the front of said glass disc in alignment with said opening, a second ring of opaque paint on the rear of said glass disc, means for securing the glass disc and retainer plate to said casing, said securing means overlying a portion of said glass disc and having openings which form indicia in alignment with said second ring of paint, and a source of light within the casing, a portion of the light rays passing through the opening in the plate and then being diffused and reflected within the glass disc.

5. In a device of the class described, a casing, a transparent disc mounted near one end of the casing, a member having indicia thereon in front of said disc, a source of light to the rear of the disc, and means for causing said light source to illuminate said indicia comprising a ring of opaque paint on the front of said disc by which the light rays are diffused and reflected within the plane of the disc and a second ring of opaque paint on the rear of the disc in alignment with the indicia to project a portion of the light rays traveling within the disc toward the indicia.

6. A device as in claim 5 in which the transparent disc is formed of glass.

7. In a device for indicating, a casing open at one end, a retainer plate having at least one opening near one edge thereof and a plurality of openings spaced from the edge, an instrument mounted in the casing behind each of the plurality of openings, a transparent disc in front of the retainer plate, a bezel member having indicia formed therein in front of said transparent disc, a light source within said casing and means for causing the light source to illuminate the indicia comprising a ring of opaque paint on the front of the transparent disc in alignment with the edge opening and a second ring of opaque paint on the back of said transparent disc in alignment with the indicia.

8. A device as in claim 7 in which the plurality of instruments are fixed to plates in groups of two, said plates being secured to the back of the casing.

9. A device as in claim 7 in which the retainer plate has a circular series of openings near the edge thereof in alignment with the ring of opaque paint on the front of the transparent panel.

10. In a device for indicating, a frame, two instrument casings secured therein, said frame having portions which overlie the instrument casings, a retainer plate for each casing having openings near the edge thereof, a transparent disc for each casing arranged in front of each retainer plate, a bezel member for each casing having a generally channel shaped portion having indicia formed therein, the bottom of said channel portion forming with the overlying portion of said frame a generally regular surface, instruments fixed to each casing, a light source within each casing and means for illuminating the indicia comprising a ring of opaque paint on the front of each transparent disc in alignment with the openings near the edge of each retainer plate and a second ring of opaque paint on the rear of each transparent disc in alignment with the indicia.

11. In a device of the class described, a transparent disc having a ring of opaque paint on the front thereof, indicia at the front of said transparent disc, a second ring of opaque paint on the rear of said transparent disc in substantial alignment with the indicia and a source of light behind the transparent disc.

12. In a device of the class described, a transparent disc, a ring of opaque paint on the front thereof, a second ring of opaque paint on the rear thereof, indicia at the front of said transparent disc in alignment with the second ring of paint, a source of light behind the transparent disc and means between the light source and the transparent disc for directing a portion of the light rays into alignment with the first ring of paint.

13. In a device of the class described, a transparent panel, opaque paint on the front thereof, an opaque member in front of said panel having openings therein forming characters, opaque paint on the rear thereof in alignment with said openings and a source of light behind the transparent panel in substantial alignment with the opaque paint on the front of the transparent dial.

14. In a device of the class described, a transparent disc having a ring of opaque material on the front thereof, indicia at the front of said transparent disc, a second ring of opaque material on the rear of said transparent disc in substantial alignment with the indicia and a source of light behind the transparent disc.

15. In a device of the class described, a transparent panel having a ring of opaque material on the front thereof, characters at the front of said transparent panel spaced from the ring of opaque material, a second ring of opaque material on the rear of said transparent panel in substantial alignment with the characters, and a source of light behind the transparent panel.

16. In a device of the class described, a transparent panel, a patch of opaque material on the front thereof, a character at the front of said transparent panel spaced from said patch of opaque material, a second patch of opaque material on the rear of said transparent panel in alignment with said character, and a source of light behind said transparent panel.

HENRY CHARLES STUERZL.